United States Patent
Hsieh et al.

(10) Patent No.: US 6,769,540 B2
(45) Date of Patent: Aug. 3, 2004

(54) HARD DISK STORAGE DEVICE FOR INDUSTRIAL COMPUTERS

(75) Inventors: Joe Hsieh, Ping-Jen (TW); Chad Liu, Ping-Jen (TW)

(73) Assignee: Eianvital Corporation, Taoyuan (TW)

( * ) Notice: Subject to any disclaimer, the term of this patent is extended or adjusted under 35 U.S.C. 154(b) by 0 days.

(21) Appl. No.: 10/412,387

(22) Filed: Apr. 14, 2003

(65) Prior Publication Data

US 2004/0079655 A1 Apr. 29, 2004

(30) Foreign Application Priority Data

Nov. 5, 2002 (TW) ...................................... 91217742 U

(51) Int. Cl.⁷ .............................................. B65D 85/30
(52) U.S. Cl. .................... 206/307; 206/723; 312/223.2; 361/685
(58) Field of Search .............................. 206/307, 308.1, 206/308.3, 309–313, 387.1, 1.5, 305, 320, 576, 722, 723; 361/683–685, 727; 312/223.2, 223.1, 223.3

(56) References Cited

U.S. PATENT DOCUMENTS 6,452,788 B1 * 9/2002 Crowley ...................... 361/685
6,481,809 B1 * 11/2002 Richardson .............. 312/223.2
6,611,424 B2 * 8/2003 Huang ......................... 361/685
6,661,651 B1 * 12/2003 Tanzer et al. ............... 361/685

* cited by examiner

Primary Examiner—Luan K. Bui
(74) Attorney, Agent, or Firm—Arent Fox, PLLC

(57) ABSTRACT

A hard disk storage device for industrial computers, comprising a casing, a fixed storage rack, a movable storage rack, a fixed rack, a frame lid, an elastic plate and a support rack; the elastic plate is utilized such that the movable storage rack is lifted as the hard disk storage device is opened, and the support rack is utilized for confining the lifting height of the movable storage rack, such that the content capacity of the storage device is increased by effective use of limited spaces.

8 Claims, 3 Drawing Sheets

HARD DISK STORAGE DEVICE FOR INDUSTRIAL COMPUTERS

BACKGROUND OF THE INVENTION

1. Field of the Invention

The present invention relates to a hard disk storage device for industrial computers, more particularly, a hard disk storage device for industrial computers mounted with movable hard disk storage device for effectively increasing the containing capacity of the hard disk storage device.

2. Description of Related Arts

Due to the growing automation of factories and diversification of industrial production, needful data processed by computer mainframes are ever increasing, especially for files containing large portions of images and pictures. Thus between central storage systems and a plurality of work stations, high-speed information transmission is in demand so as to shorten the procedural processing time, particularly the fluency of transmission for image files. Therefore, the containing capacity of storage systems, the security of data and speed of execution efficiency are the three most important features for current industrial computers.

The heights for general industrial computer casings range from 1u to 8u, with 1u (44.45 mm) being the standard of height adopted by industrial computer casings.

Since general industrial computer casings are standardized, the storage capacity thereof are thus confined due to the limited space available, also most storage device are mounted at the front of industrial computer casings so as to provide heat-exchanging function for hard disk modules, a design that renders the conventional storage systems incapable of providing support if larger hard disk storage capacity is required.

SUMMARY OF THE INVENTION

The primary object of the present invention is to provide a hard disk storage device for industrial computers by utilizing a plurality of elastic plates such that a movable storage rack is automatically lifted as the hard disk storage device is opened, and a support rack is utilized for confining the lifting height of the movable storage rack. As a result, the containing capacity of the storage device is increased by effective use of limited space.

The hard disk storage device for industrial computers that achieves the foregoing objects comprises a casing having a fastening plate disposed at the bottom thereof; a fixed storage rack formed by a plurality of dividers and an upper cover, and such dividers are utilized for defining the containing spaces for hard disks; a movable storage rack formed by a plurality of dividers, an upper cover and a frame lid, and the dividers are utilized for defining the containing spaces for hard disks, and the movable storage rack is an individual component capable of being separated from the casing; a plurality of fixation racks laterally mounted in the casing for dividing spaces between the fixed storage rack, the movable storage rack and other components, with the flat board thereof being plainly formed; a frame lid for covering the fixed storage rack and other components; at least one elastic plate mounted at the bottom of the casing for lifting the movable storage rack, and a support rack with one end thereof engaged at the bottom of the movable storage rack and with the other end thereof fastened with the fastening plate at the bottom inside the casing for limiting the lifting height of the movable storage rack.

Locking members are further mounted on the movable storage rack for fastening the movable storage rack with the flat board of one of the fixation racks, such that the movable storage rack is fixated co-planar to the fixed storage rack for both the movable storage rack and the fixed storage rack to be covered by the frame lid.

A roller can be mounted on top of the elastic plate to get into contact with the bottom of the movable storage rack, so as to reduce noise or attrition.

The locking member can be of translational or rotational design.

The locking member can be fastened to any position of the casing.

The supporting rack can be U-shaped or in other shapes.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

DETAILED DESCRIPTION OF THE PREFERRED EMBODIMENT

The following is a detailed description of the best presently known modes of carrying out the inventions. This description is not to be taken in a limiting sense, but is made merely for the purpose of illustrating the general principles of the inventions.

Figure 1:
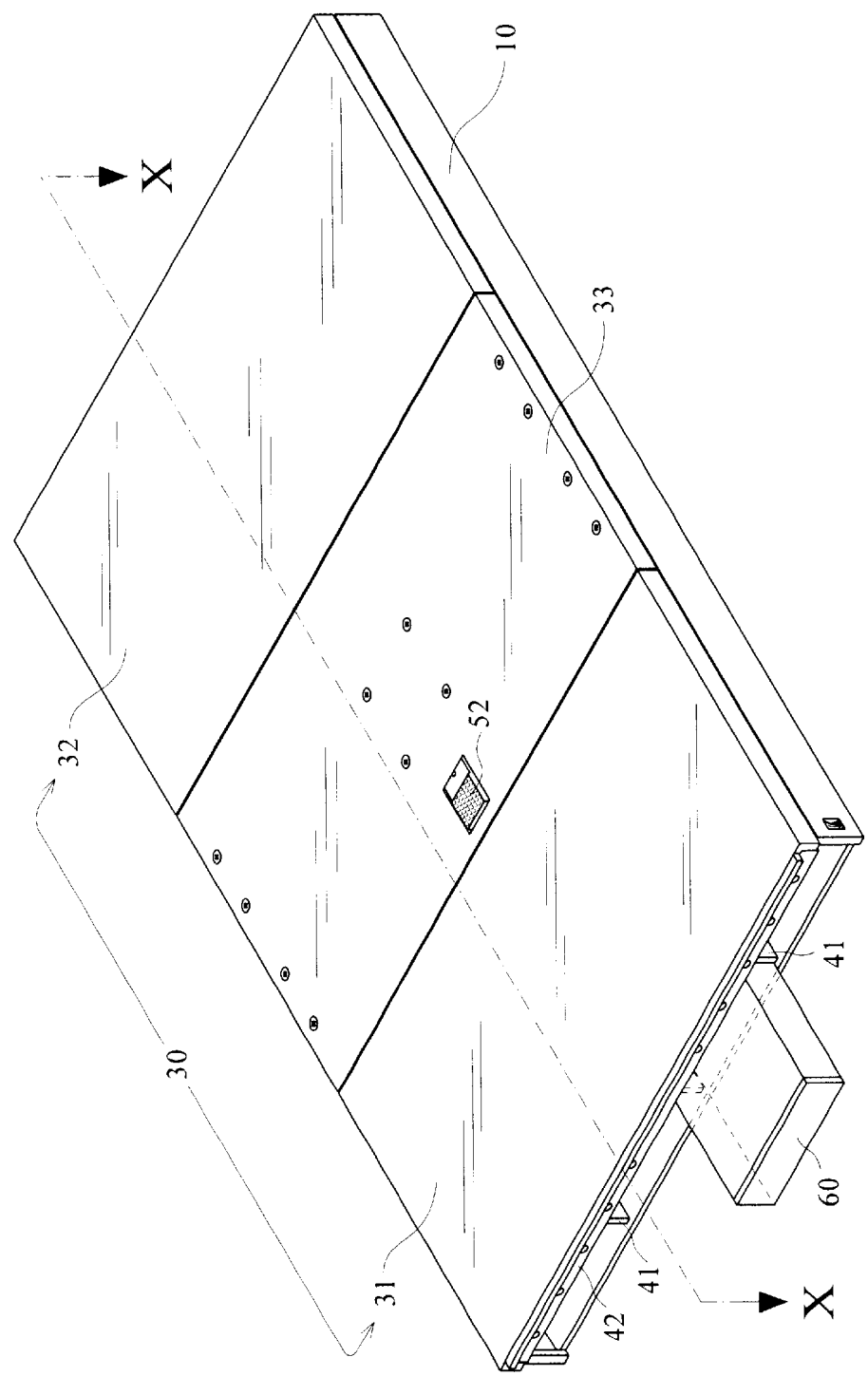
FIG. 1 shows an outer isometric view of the hard disk storage device for industrial computers of the present invention.
Figure 2:
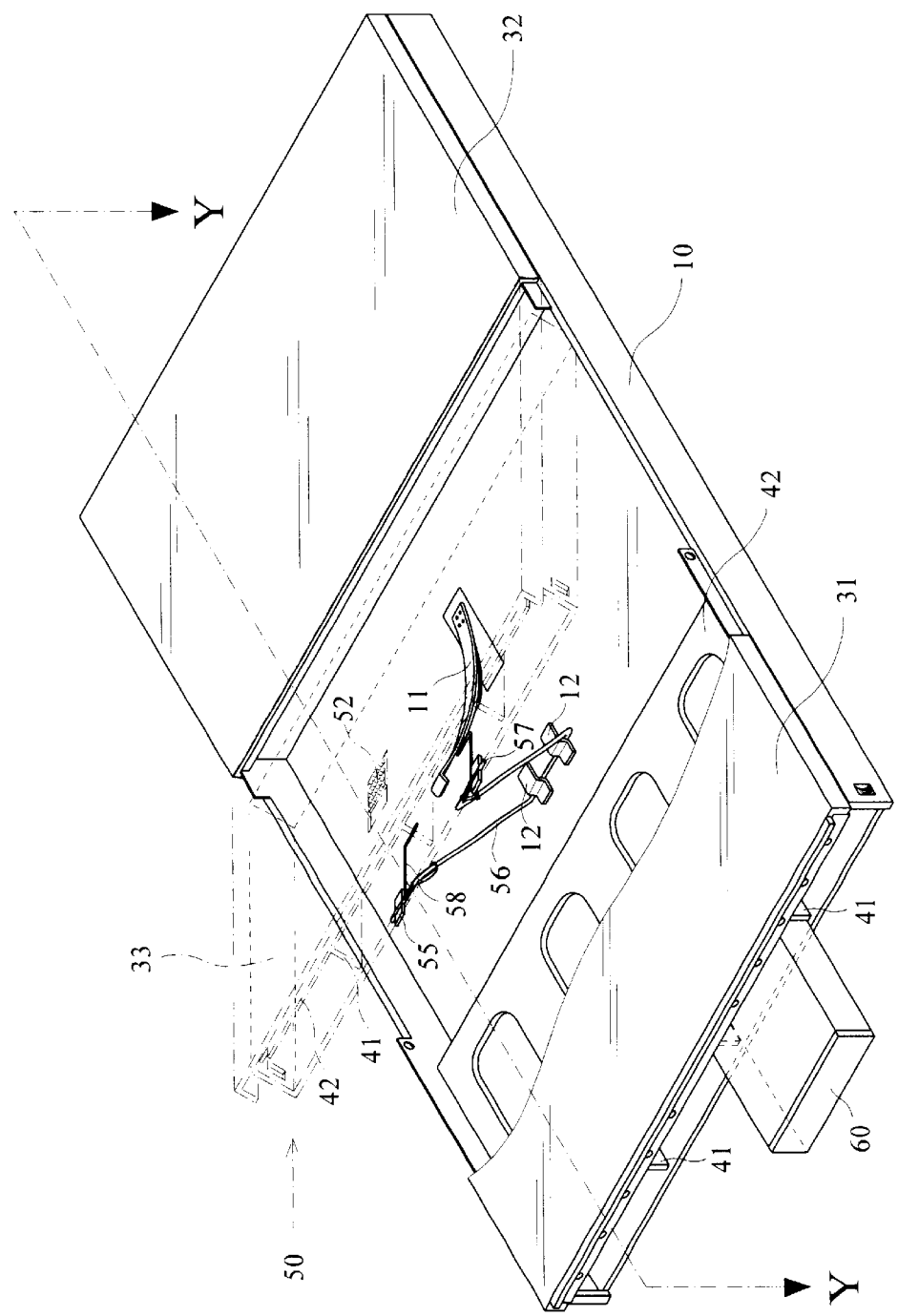
FIG. 2 shows a partial inner perspective view of the hard disk storage device for industrial computers of the present invention.

Please refer to FIG. 1 showing the outer isometric view of the hard disk storage device for industrial computers of the present invention in,accordance with FIG. 2 showing a partial inner perspective view of the hard disk storage device for industrial computers of the present invention.

The hard disk storage device for industrial computers of the present invention capable of containing a plurality of hard disks 60 comprises a casing 10, a fixed storage rack 40, a movable storage rack 50, a plurality of fixation racks 20, a frame lid 30, an elastic plate 11 and a U-shaped support rack 56, wherein two fastening plates 12 are mounted on the bottom of the casing 10 for fastening the U-shaped support rack 56; the fixed storage rack 40, formed by a plurality of dividers 41 and an upper cover 42, is mounted at the front side of the casing 10, with the dividers 41 utilized for defining the containing spaces for hard disks 60; the movable storage rack 50 formed by a plurality of dividers 41, an upper cover 42 and a frame lid 33, with the dividers 41 utilized for defining the containing spaces of hard disks 60. Further, as the top of the upper cover 42 is engaged with the frame lid 33, the frame lid 33 can also be detached at the same time when the movable storage rack 50 is detached from the casing 10 without spending extra time to detach the frame lid 33. A fastening portion 35 (referring to FIG. 3 and FIG. 4) is mounted at the rear side of the frame lid 33 of the movable storage rack 50, and a locking member 52 is mounted between the upper cover 41 at the front side of the movable storage rack 50 and the frame lid 33. The locking member 52 includes an actuating portion 53 having both an engaging portion 51 and a tail portion 54 at two sides. By means of operating the actuating portion 53 so as to slide the locking member 52 leftwards, the engaging portion 51 is engaged under a flat board 23 of a first fixation rack 21. A pair of positioning plates 55 are fitted to an outward edge of the bottom of the movable storage rack 50; two end portions 57 of the U-shaped support rack 56 are pivotally connected to respective positioning plates 55 of the movable storage rack 50; besides the first fixation rack 21, the fixation rack 20 further has a second fixation rack 22.

Figure 3:
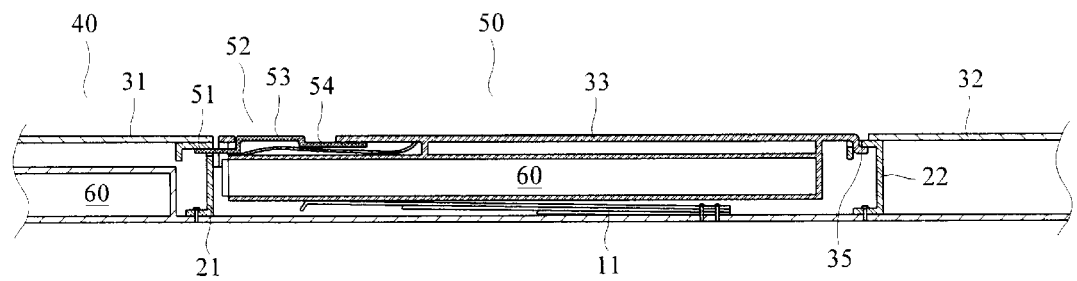
FIG. 3 shows a sectional view of the movable storage rack being closed in the direction of X—X line in FIG. 1.
Figure 4:
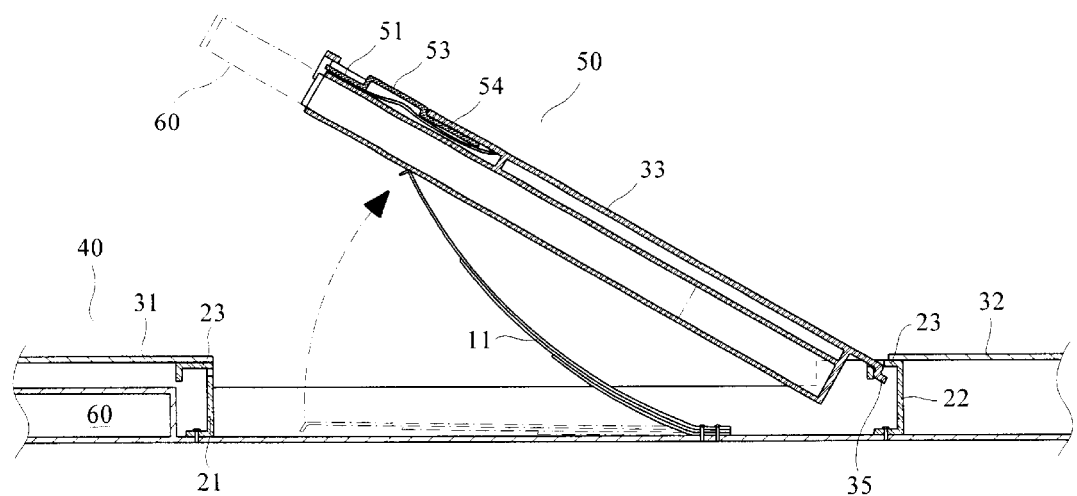
FIG. 4 shows a sectional view of the movable storage rack being opened in the direction of Y—Y line in FIG. 2.

The first and the second fixation racks 21, 22 are disposed across the inner room of the casing 10 in order to define separate areas for the fixated storage rack 40, the movable storage rack 50, and other components. Each of the first and the second fixation racks 21, 22 is formed with a flat board 23, as shown in FIGS. 3 and 4. The flat board 23 of the first fixation rack 21 is provided to engage the locking member 52 of the movable storage rack 50, and the flat board 23 of the second fixation rack 22 is provided for allowing the fastening portion 35 of the frame lid 33 to be engaged therewith. The frame lid 30 includes a front frame lid 31 for covering the top of fixed storage rack 40, and a rear frame lid 32 for covering the top of other components, which include electronic components such as heat dissipating fans or power supply means. The amount of the elastic plates 11 is at least one, and the elastic plates 11 are stacked one upon another when the amount thereof is more than one. Such elastic plates 11 are disposed on the bottom of the casing 10 so as to provide upward force to the movable storage rack 50. The U-shaped support rack 56 is connected to the movable storage rack 50. The end portions 57 of the U-shaped support rack 56 are pivotally connected to respective positioning plates 55 fitted to the bottom of the outward edge of the movable storage rack 50; a spring 58 is jointed to the bottom of the outward edge of the movable storage rack 50 at one end, with the other end winding around an end portion 57 of the U-shaped support rack 56, so that the moving directions of the U-shaped support rack 56 is elastically controlled by the spring 58. The other end of the U-shaped support rack 56 is utilized for engaging the two fastening plates 12 disposed at the bottom of the casing 10, so as to limit the lifting height of the movable storage rack 50 as the movable storage rack 50 is lifted. When the movable storage rack 50 is unlocked, the elastic plate 11 of the casing 10 is to lift automatically and prop against the movable storage rack 50 at the bottom of the outer edge thereof, such that the movable storage rack 50 is lifted after being unlocked.

Referring to FIG. 3 in accordance with FIG. 1, which shows a sectional view of the hard disk storage device for industrial computers of the present invention in the closed position, with the U-shaped support rack 56 being omitted. As the movable storage rack 50 is closed, the elastic plate 11 is pressed by the movable storage rack 50 and thus closely propped against the casing 10. At this time the engaging portion 51 of the locking member 52 is engaged and fastened underneath the flat board 23 of the first fixation rack 21, such that the movable storage rack 50 is fixated between the first and the second fixation rack 21 and 22.

FIG. 4 shows is a sectional view of the hard disk storage device for industrial computers of the present invention in the opened position, with the U-shaped support rack 56 being omitted also. As the movable storage rack 50 is about to be opened, the locking member 52 in the flat board 23 is first pressed backwardly, so that the engaging portion 51 of the locking member 52 is receded from underneath the flat board 23 of the first fixation rack 21. At this time the elastic force of the elastic plate 11 generated due to pressing is released so as to generate the elastic recoiling force, thus enabling the movable storage rack 50 to be lifted, subsequently one end of the U-shaped support rack 56 is caused to slidably contact the casing 10 and engage with the two fastening plates 12 so as to limit the lifting height of the movable storage rack 50. Therefore, hard disks 60 stored in the movable storage rack 50 can be retrieved and replaced.

According to another embodiment of the present invention, the movable storage rack thereof can be disposed at any positions of the casing 10 based upon various needs.

Although the present invention has been described in considerable detail with reference to certain preferred embodiments thereof, those skilled in the art can easily understand that all kinds of alterations and changes can be made within the spirit and scope of the appended claims. For example, the locking member of the present invention can be replaced by a rotatable button that needs relatively smaller force to operate thereon, and at the same time capable of achieving the identical effect as that of the locking member. Also the number of elastic plates of the present invention can be increased according to various needs, so as to enhance the elastic force for lifting the movable storage rack. Even a roller can be disposed on top of the elastic plates, so as to reduce attrition caused by the contact between elastic plates and the movable storage rack. The flat-shaped elastic plates are utilized for corresponding to the limited spaces inside industrial computers. Surely the shape of elastic plates of the present invention is not limited to such flat-shaped design. In addition, supporting racks that are not U-shaped can also be used instead of the above U-shaped support racks, and other device can also replace the U-shaped support racks for limiting the lifting height of the movable storage rack as the movable storage rack is opened. Therefore, the spirit and scope of the appended claims should not be limited to the description of the preferred embodiments contained herein.

What is claimed is:

1. A hard disk storage device for industrial computers, comprising:

a casing;

a fixed storage rack formed by a plurality of dividers and an upper cover, said dividers utilized for defining the containing spaces for hard disks;

a movable storage rack formed by a plurality of dividers, an upper cover and a frame lid, said dividers utilized for defining the containing spaces for hard disks;

a plurality of fixation racks laterally mounted in said casing for dividing spaces of said fixed storage rack, said movable storage rack and other components;

a frame lid for covering the top of said fixed storage rack;

an elastic plate mounted at the bottom of said casing for lifting said movable storage rack; and a support rack mounted between the bottom of said movable storage rack and said casing for confining the lifting height of said movable storage rack.

2. The hard disk storage device for industrial computers as in claim 1, wherein one end of said support rack is fixated at the bottom of said movable storage rack by positioning plates and the other end of said support rack is to slidably contact said casing.

3. The hard disk storage device for industrial computers as in claim 2, wherein elastic plates are mounted on the end of said support rack fixated at the bottom of said movable storage rack.

4. The hard disk storage device for industrial computers as in claim 1, wherein fastening plates are mounted on said casing such that the end of said support rack is to engage therewith through sliding contact.

5. The hard disk storage device for industrial computers as in claim 1, wherein said support rack is in U-shaped form.

6. The hard disk storage device for industrial computers as in claim 1, wherein one end of said movable storage rack is fastened with said casing.

7. The hard disk storage device for industrial computers as in claim 1, wherein said movable storage rack is an individual component capable of being detached from said casing.

8. The hard disk storage device for industrial computers as in claim 1, wherein a locking member is further mounted on said movable storage rack such that said locking member can be fastened with one of said fixation racks.

* * * * *